3,823,121
POLYMERIZATION PROCESS

Dale C. Perry, Akron, Ohio, assignor to The Goodyear Tire & Rubber Company, Akron, Ohio
No Drawing. Filed Nov. 9, 1972, Ser. No. 305,019
Int. Cl. C08d 1/14, 3/04
U.S. Cl. 260—82.1      8 Claims

ABSTRACT OF THE DISCLOSURE

The method of polymerization of isoprene-butadiene mixtures to form copolymers having improved processing characteristics and to catalyst systems useful for this purpose.

---

This invention is directed to a method of polymerization of isoprene-butadiene mixtures to form copolymers having improved processing characteristics. It is also directed to catalyst systems useful for this purpose. It is also directed to the composition of the isoprene-butadiene copolymers.

It is known that soluble aluminum-titanium (Al-Ti) catalysts homopolymerize isoprene to a spatially oriented polymer having a predominantly 3,4-structure. It is also known that soluble Al-Ti catalysts homopolymerize butadiene to a spatially oriented polymer having a predominantly 1,2-structure. However, each of these homopolymers has distinct drawbacks when they are used for commercial applications. The homopolymerized polyisoprene is of rather low molecular weight, quite tacky, and susceptible to cold flow. The homopolymerized butadiene is highly gelled and hence very difficult to process with ordinary processing machinery.

Therefore, physical blends of these two homopolymers do not produce a satisfactory mixture which would be useful as a general purpose synthetic rubber.

However, it has been discovered that mixtures of the above monomers provide isoprene-butadiene copolymers which overcome the deficiencies of each homopolymer and enable one to obtain from these catalysts pendant structured elastomers having high molecular weight and low gel content. As a result the processing characteristics of the copolymers are superior to those of either of the homopolymers or mixtures thereof.

Thus, it is the object of this invention to utilize soluble Al-Ti catalysts to polymerize mixtures of the monomers isoprene and butadiene to pendant structured elastomers which are both cold flow resistant and moldable, a combination of properties unobtainable with either homopolymers or blends thereof. For commercial purposes, a selected isoprene-butadiene mixture is polymerized with a selected soluble Al-Ti catalyst system in order to obtain the desired physical properties and processing characteristics. These desirable characteristics are high molecular weight, low gel polymers, which process easily and which can be easily vulcanized to make moldable rubber products.

According to the invention an isoprene-butadiene mixture, said mixture containing from about 5 to about 50 mole percent butadiene, is copolymerized, by contacting under solution polymerization conditions, with a catalyst comprising (1) at least one organoaluminum compound and (2) at least one organotitanium compound wherein the isoprene and butadiene units assume a high proportion (70%) of pendant configuration within the copolymer.

By the term "organoaluminum compound" is meant any organoaluminum compound responding to the formula:

in which R contains from 1 to 12 carbon atoms, is selected from the group consisting of alkyl, cycloalkyl, aryl, alkaryl, arylalkyl and hydrogen; $R_1$ and $R_2$ contain from 1 to 12 carbon atoms, being selected from the group of alkyl, cysloalkyl, aryl, alkaryl and arylalkyl. Representative of the compounds responding to the formula set forth above are diethyl aluminum hydride, di-n-propyl aluminum hydride, di-n-butyl aluminum hydride, diisobutyl aluminum hydride, diphenyl aluminum hydride, di-p-tolyl aluminum hydride, dibenzyl aluminum hydride, phenyl ethyl aluminum hydride, phenyl-n-propyl aluminum hydride, p-tolyl ethyl aluminum hydride, p-tolyl n-propyl aluminum hydride, p-tolyl isopropyl aluminum hydride, benzyl ethyl aluminum hydride, benzyl-n-propyl aluminum hydride, and benzyl isopropyl aluminum hydride and other organoaluminum hydrides. Also included are trimethyl aluminum, triethyl aluminum, tri-n-propyl aluminum, triisopropyl aluminum, tri-n-butyl aluminum, triisobutyl aluminum, tripentyl aluminum, trihexyl aluminum, tricyclohexyl aluminum, trioctyl aluminium, triphenyl aluminum, tri-p-tolyl aluminum, tribenzyl aluminum, ethyl diphenyl aluminum, ethyl di-p-tolyl aluminum, ethyl dibenzyl aluminum, diethyl phenyl aluminum, diethyl p-tolyl aluminum, diethyl benzyl aluminum and other tri-organoaluminum compounds.

The organoaluminum compound component of this invention may also be associated with compounds that readily associate themselves with the organoaluminum compound.

The compounds which associate with the organoaluminum to form this component of the catalyst are the type which are capable of associating with the organoaluminum through the lending or sharing of electrons. Compounds useful and capable of associating are ethers.

The ethers subclass can be defined by the formula R'OR where R and R' represent alkyl, cycloalkyl, aryl, alkaryl, and arylalkyl radicals containing from about 1 to about 30 carbon atoms; R and R' may be the same or dissimilar. The R's may also be joined through a common carbon bond to form a cyclic ether with the ether oxygen being an integral part of the structure such as tetrahydrofuran, furan or dioxane. These ethers represent a class of compounds which have two carbon atoms attached by single bonds to an oxygen atom. Representative but not exhaustive of the ethers useful in the preparation of the organoaluminum associated compounds of this invention are dimethyl, diethyl, dibutyl, diamyl, diisopropyl ethers or tetrahydrofuran, anisole, diphenyl ether, ethyl methyl ether, dibenzyl ether and the like.

By the term "organotitanium compound" is meant any organotitanium compound responding to the formula:

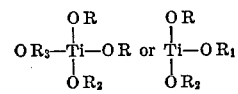

in which the titanium molecule exhibits the valence of either three (3) or four (4), where O is oxygen and R, $R_1$, $R_2$, $R_3$ are hydrocarbon radicals selected from the group consisting of alkyl, cycloalkyl, aryl, arylalkyl and alkaryl radicals containing from about one to about ten carbon atoms.

Representative of the compounds responding to the formulas set forth above are titanium tetra-n-butoxide, titanium tetra-isopropoxide, titanium tetra cyclopentoxide, titanium tetraphenoxide, titanium tri-n-butoxide, titanium triisopropoxide, titanium tricyclopentoxide, and titanium triphenoxide.

In general, the polymerizations of this invention are carried out in any inert solvent, and are, thus, solution polymerizations. By the term "inert solvent" is meant that the solvent does not enter into the structure of the resulting polymer nor does it have any adverse effect on the activity of the catalyst employed. Such solvents are usually aliphatic, aromatic, or cycloaliphatic hydrocarbons, examples of which are pentane, hexane, toluene, benzene, cyclohexane and the like.

It should be understood, however, that it is not intended to exclude bulk polymerizations from the scope of this application.

It is usually desirable to conduct the polymerizations of this invention employing air-free and moisture-free techniques.

The temperatures employed in the polymerizations of this invention are not critical and may range from about −10° C. to about 80° C.

This two-component catalyst system has polymerization activity over a wide range of catalyst concentrations and catalyst ratios. The two catalyst components inter-react to form the active catalyst. As a result, the optimum concentration for any one catalyst is very dependent upon the concentration of the other catalyst component. Furthermore, while polymerizations will occur over a wide range of catalyst concentrations and ratios, polymers having the most desirable properties are obtained over a narrower range. Polymerization can occur while the mole ratio of the organoaluminum compound to the organotitanium compound ranges from about 0.5/1 to about 20/1. However, the preferred mole ratio of organoaluminum compound to the organotitanium compound ranges from about 2/1 to about 10/1.

The concentration of the catalyst employed depends on factors such as purity, rate desired, temperature and other factors, therefore, specific concentrations cannot be set forth except to say that catalytic amounts are used. Some specific concentrations and ratios which produce elastomers having desirable properties will be illustrated in the examples given herein to explain the teachings of this invention.

Even if these same catalysts are used to make the homopolymer of isoprene and the homopolymer of butadiene, then blended together physically, the resulting polymer blend does not give the physical and chemical properties obtained by using this invention.

However, when the isoprene-butadiene mixtures are polymerized, where said mixtures contain from about 5 to about 50 mole percent of butadiene, a copolymer is made with a high proportion of isoprene and butadiene groups in the pendant configuration and characterized by the unexpected properties described within this invention.

It is believed by NMR analysis of the isoprene-butadiene copolymer that about 70 percent of the monomer units within the copolymer assume a pendant structure illustrated as

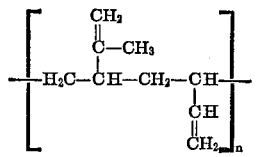

The practice of this invention is further illustrated by reference to the following examples which are intended to be representative rather than restrictive of the scope of this invention.

EXAMPLE I

To 25 milliliters of dry pentane contained in dry, air-free 4-ounce bottles was added (a) 4.43 millimoles triethyl aluminum (TEAL) and (b) 0.672 millimoles titanium tetra-isopropoxide (TITOP). After aging of the catalyst mixture for 30 minutes, 0.25 total moles of isoprene, butadiene or a mixture of the two was added to each of the bottles. After a 24-hour reaction period at room temperature, the polymerizations were terminated by the addition of isopropanol. Polymer yields and properties are given in Table 1:

TABLE 1

| Experiment number | Mole percent butadiene in feed | Percent conversion | DSV | Percent gel |
|---|---|---|---|---|
| 1 | 5 | 39 | 2.20 | 13 |
| 2 | 10 | 44 | 2.85 | 9 |
| 3 | 15 | 43 | 3.43 | 16 |
| 4 | 25 | 49 | 4.56 | 19 |
| 5 | 35 | 53 | 5.36 | 17 |
| 6 | 50 | 67 | 6.10 | 24 |

EXAMPLE II

To ten-gallon glass lined reactor, free of air and moisture was charged 14,000 grams pentane, 1.25 moles triethylaluminum, and 0.192 moles titanium tetra-iso-propoxide. After aging of the resulting mixture for 1 hour at 25° C., 757 grams (14 moles) butadiene and 3814 grams (56 moles) isoprene was added in rapid succession, butadiene first. The reaction was terminated after 30 hours at 25° C. A copolymer yield of 1317 grams was obtained with the properties indicated in Table 2:

TABLE 2

DSV (toluene, 30° C.) _____ 4.65
Percent Gel _____ 22
Swelling Index _____ 102
ML-4 _____ 72
Olsen Flow _____ 176

The above properties are ideal for polymer processing and are unobtainable with these catalysts from either an isoprene or butadiene homopolymerization.

Definition of terms used in Example II:

DSV–dilute solution viscosity.
Swelling Index—amount, in percent, a sample swells when placed in a given solvent.
ML-4—Mooney large measurement of the polymer toughness by using rotating disk.
Olsen Flow—Amount a polymer flows through an orifice under a particular pressure and beating.

While certain representative embodiments and details have been shown for the purpose of illustrating the invention, it will be apparent to those skilled in this art that various changes and modifications may be made therein without departing from the spirit or scope of the invention.

What is claimed is:

1. A method of polymerizing butadiene isoprene mixtures, wherein said mixtures contain from about 5 to about 50 mole percent butadiene, to form copolymers containing at least 70% of isoprene and butadiene groups in the pendant configuration, under slution polymerization conditions with a catalyst consisting essentially of (1) an organoaluminum responding to the formula

in which R, containing from one (1) to twelve (12) carbon atoms, is selected from the group consisting of alkyl, cycloalkyl, aryl and hydrogen; $R_1$ and $R_2$ contain from one to 12 carbon atoms, being selected from the group consisting of alkyl, cycloalkyl and aryl, and (2) an organotitanium compound selected from the compounds responding to the formulas

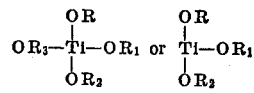

in which the titanium molecule exhibits the valence of either three (3) or four (4), wherein O is oxygen and R, $R_1$, $R_2$ and $R_3$ are hydrocarbon radicals containing from one to 10 carbon atoms and selected from the group consisting of alkyl, cycloalkyl and aryl radicals.

2. A process according to Claim 1 in which the organoaluminum compound is selected from the group consisting of diethyl aluminum hydride, di-n-propyl aluminum hydride, di-n-butyl aluminum hydride, diisobutyl aluminum hydride, diphenyl aluminum hydride, di-p-tolyl aluminum hydride, dibenzyl aluminum hydride, phenyl ethyl aluminum hydride, phenyl-n-propyl aluminum hydride, p-tolyl ethelyl aluminum hydride, p-tolyl n-propyl aluminum hydride, p-tolyl isopropyl aluminum hydride, benzyl ethyl aluminum hydride, benzyl-n-propyl aluminum hydride, benzyl isopropyl aluminum hydride, trimethyl aluminum, triethyl aluminum, tri-n-propyl aluminum, triisopropyl aluminum, tri-n-butyl aluminum, triisobutyl aluminum, tripentyl aluminum, trihexyl aluminum, tricyclohexyl alminum, trioctyl aluminum, triphenyl aluminum, tri-p-tolyl aluminum, tribenzyl aluminum, ethyl diphenyl aluminum, ethyl di-p-tolylaluminum, ethyl dibenzyl aluminum, diethyl phenyl aluminum, diethyl p-tolyl aluminum, diethyl benzyl aluminum.

3. A process according to Claim 1 in which the organotitanium compound is selected from the group consisting of titanium tetra-n-butoxide, titanium tri-n-butoxide, titanium tetra-iso-propoxide, titanium tri-iso-propoxide, titanium tetracyclopentoxide, titanium tricyclopentoxide, titanium tetraphenoxide and titanium triphentoxide.

4. A process according to Claim 1 in which the mole ratio of the organoaluminum compound to the organotitanium compound ranges from about 0.5/1 to about 20/1.

5. A process according to Claim 1 in which the preferred mole ratio of the organoaluminum compound to the organotitanium compound ranges from about 2/1 to about 10/1.

6. A process according to Claim 1 in which the organoaluminum compound is complexed with other compounds selected from the group consisting of dimethyl ether, diethyl ether, dibutyl ether, diamyl ether, diisopropyl ether, tetrahydrofuran, anisole, diphenyl ether, ethyl methyl ether, and dibenzyl ether.

7. As a composition of matter isoprene butadiene copolymers wherein at least 70 percent of the monomeric units have the following repeating unit configuration:

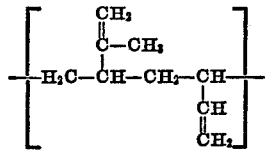

obtained by reacting butadiene isoprene mixtures containing from about 5 to about 50 mole percent butadiene under solution polymerization conditions with a catalysts consisting essential of (1) an organoaluminum responding to the formula

in which R containing from one to 12 carbon atoms, is selected from the group consisting of alkyl, cycloalkyl, aryl and hydrogen; $R_1$ and $R_2$ contain from one to 12 carbon atoms, being selected from the group consisting of alkyl, cycloalkyl and aryl, and (2) an organotitanium compound selected from the compounds responding to the formulas

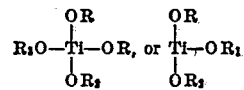

in which the titanium molecule exhibits the valence of either three or four, wherein O is oxygen and R, $R_1$, $R_2$ and $R_3$ are hydrocarbon radicals containing from one to 10 carbon atoms and selected from the group consisting of alkyl, cycloalkyl and aryl radicals.

8. The composition according to Claim 7 in which the isoprene units vary from about 50 to about 95 mole percent and the butadiene units vary from about 5 to about 50 mole percent.

References Cited
UNITED STATES PATENTS

| | | | |
|---|---|---|---|
| 3,477,999 | 11/1969 | Takeda et al. | 260—82.1 X |
| 3,506,632 | 4/1970 | Henderson | 260—82.1 X |
| 3,629,222 | 12/1971 | Coover et al. | 260—93.7 |

JOSEPH L. SCHOFER, Primary Examiner

W. F. HAMROCK, Assistant Examiner

U.S. Cl. X.R.

252—431 R